United States Patent
Xiao

(10) Patent No.: US 12,504,922 B2
(45) Date of Patent: Dec. 23, 2025

(54) METHOD AND APPARATUS FOR IMPROVING PROCESSING CAPABILITIES OF A MEMORY CONTROLLER FOR ERROR INFORMATION

(71) Applicant: YANGTZE MEMORY TECHNOLOGIES CO., LTD., Wuhan (CN)

(72) Inventor: Yong Xiao, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 121 days.

(21) Appl. No.: 18/487,981

(22) Filed: Oct. 16, 2023

(65) Prior Publication Data

US 2025/0028480 A1    Jan. 23, 2025

(30) Foreign Application Priority Data

Jul. 21, 2023   (CN) .......................... 202310907899.4

(51) Int. Cl.
*G06F 3/06* (2006.01)

(52) U.S. Cl.
CPC ............ *G06F 3/0658* (2013.01); *G06F 3/061* (2013.01); *G06F 3/0679* (2013.01)

(58) Field of Classification Search
CPC ....... G06F 3/0658; G06F 3/061; G06F 3/0659
See application file for complete search history.

(56) References Cited

U.S. PATENT DOCUMENTS

| | | | |
|---|---|---|---|
| 2010/0106816 A1 | 4/2010 | Gulati et al. | |
| 2017/0083252 A1* | 3/2017 | Singh | G06F 9/5016 |
| 2022/0050629 A1* | 2/2022 | Vlasov | G06F 3/0656 |

FOREIGN PATENT DOCUMENTS

| | | |
|---|---|---|
| CN | 104024979 A | 9/2014 |
| CN | 115454902 A | 12/2022 |
| WO | 2020000483 A | 1/2020 |

OTHER PUBLICATIONS

NVM Express Workgroup, NVM Express Revision 1.2a, Oct. 23, 2015 [retrieved from internet Apr. 10, 2025][<URL:https://www.nvmexpress.org/wp-content/uploads/NVM-Express-1_2a.pdf>] (Year: 2015).*

Microsoft, NVME_ASYNC_EVENT_ERROR_STATUS_CODES enumeration (nvme.h), Mar. 12, 2023 [retrieved from internet Apr. 10, 2025 ][<URL:https://learn.microsoft.com/en-us/windows/win32/api/nvme/ne-nvme-nvme_async_event_error_status_codes>] (Year: 2023).*

Yangtze Memory Technologies Co., Ltd., "First Examination Opinion Notice," Date of Publication: Aug. 29, 2025, Chinese Patent App. No. 202310907899.4, 11 p. (translation 11 p.).

* cited by examiner

*Primary Examiner* — Nicholas A. Paperno
(74) *Attorney, Agent, or Firm* — Conley Rose, P.C.

(57) ABSTRACT

Examples of the present disclosure provide a method of operating a memory controller, a memory system, and electronic device. The method of operating a memory controller includes receiving a command to create an input/output (IO) queue. When a first transmission value of the IO queue exceeds a preset value range, the method includes sending target indication information. The target indication information is to indicate that the first transmission value is invalid and the first transmission value indicates a size of information received by the IO queue.

20 Claims, 10 Drawing Sheets

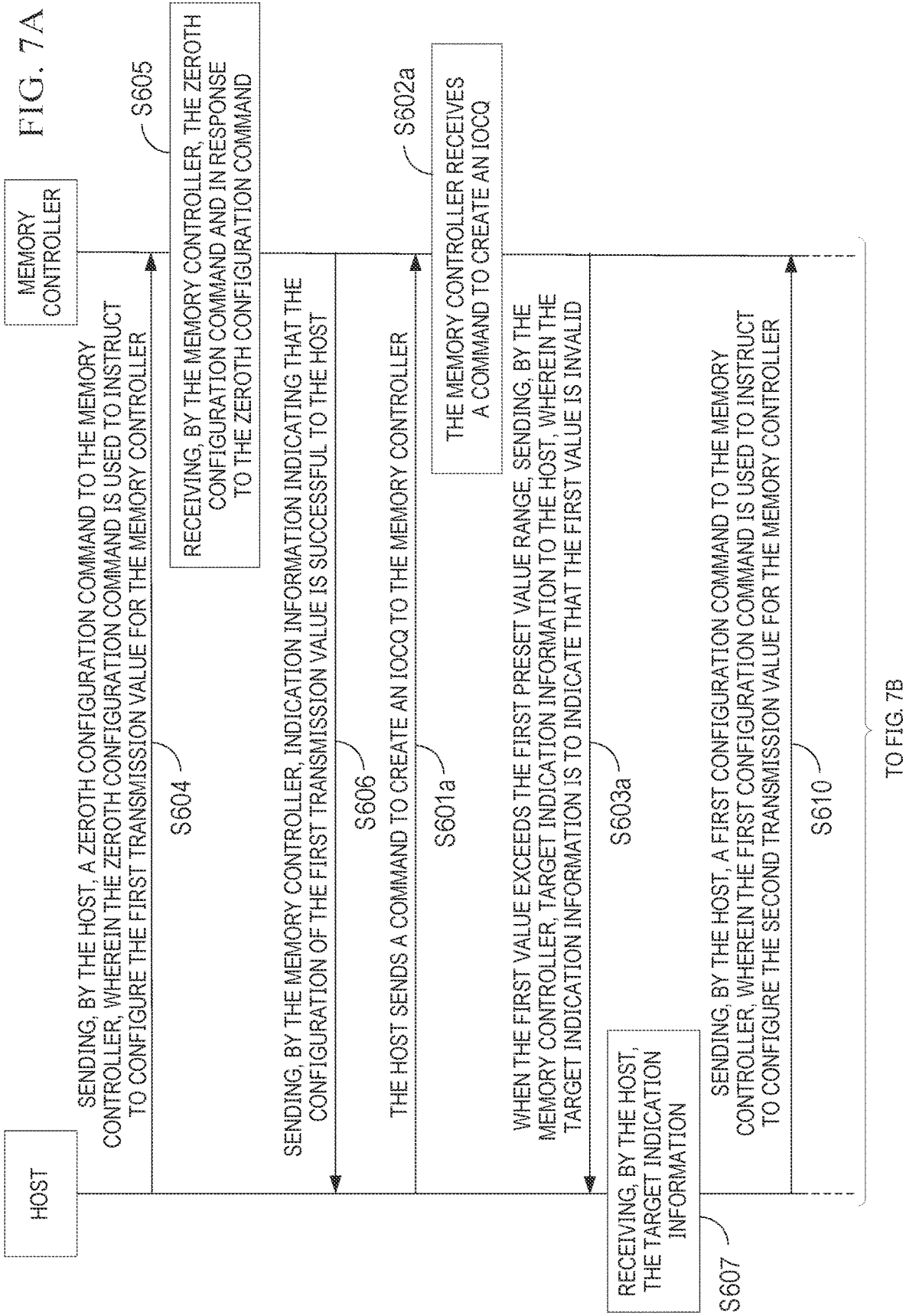

METHOD AND APPARATUS FOR IMPROVING PROCESSING CAPABILITIES OF A MEMORY CONTROLLER FOR ERROR INFORMATION

CROSS-REFERENCE TO RELATED APPLICATIONS

The present application claims priority to Chinese Patent Application No. 2023109078994, which was filed Jul. 21, 2023, is titled "A STORAGE CONTROLLER OPERATING METHOD, STORAGE SYSTEM AND ELECTRONIC EQUIPMENT," and is hereby incorporated herein by reference in its entirety.

TECHNICAL FIELD

The present disclosure relates to the field of communication technology, and in particular to a method of operating a memory controller, a memory system and an electronic device.

BACKGROUND

Non-volatile memory host controller interface specification (NVMHCIS) (NVMe for short) is a logical device interface specification that defines commands and data formats for communication between a solid state disk (SSD) and a host. As a command layer and application layer protocol, NVMe is theoretically compatible with any interface protocol, and matches peripheral component interconnect express (PCIe) interface in application.

SUMMARY

Examples of the present disclosure provide a method of operating a memory controller, a memory system, and an electronic device which relate to the field of communication technology and aim to improve the performance of the memory controller.

In one aspect, a method of operating a memory controller is provided, the method comprises: receiving a command to create an input/output (IO) queue; and when a first transmission value of the IO queue exceeds a preset value range, sending target indication information, wherein the target indication information is to indicate that the first transmission value is invalid, and the first transmission value indicates a size of information received by the IO queue.

In the method of operating the memory controller as provided in the examples of the present disclosure, when the first transmission value of the IO queue exceeds the preset value range, the indication information indicating that the size of the information received by the IO queue is invalid may be sent, and the host may receive the indication information and may determine whether to reconfigure the transmission value for the memory controller and whether to proceed subsequent IO traffic, which improves the processing capability of the memory controller for error information, that is, improves the performance of the memory controller.

In some examples, the IO queue comprises an input/output completion queue, the first transmission value comprises a first value, the preset value range comprises a first preset value range, the first value indicates a size of an execution result received by the input/output completion queue, and the first value exceeds the first preset value range. In the above possible examples, when the first transmission value exceeds the first preset range, indication information indicating that the size of the information received by the input/output completion queue is invalid is sent, which improves the processing capability of firmware in the memory controller for the error information, that is, improves the performance of the firmware.

In some examples, the IO queue comprises an input/output submission queue, the first transmission value comprises a second value, the preset value range comprises a second preset value range, the second value indicates a size of a command received by the input/output submission queue, and the second value exceeds the second preset value range. In the above possible examples, when the second transmission value exceeds the second preset range, an indication information indicating that the size of the information received by the input/output submission queue is invalid is sent, which improves the processing capability of the firmware in the memory controller for the error information, that is, improves the performance of the firmware.

In some examples, the method further comprises: creating the IO queue according to a second transmission value, wherein the second transmission value is within the preset value range; and sending indication information indicating that the IO queue is successfully created. In the above possible examples, the IO queue is created based on the second transmission value, which ensures normal execution of subsequent IO traffic.

In some examples, the second transmission value comprises a recommended value in a non-volatile memory host controller interface specification (NVMe). In the above possible examples, the IO queue is created based on the recommended value in the NVMe, which increases the selectivity of the second transmission value.

In some examples, the method further comprises: receiving a first configuration command, wherein the first configuration command is used to instruct to configure the second transmission value for the memory controller; and in response to the first configuration command, sending indication information indicating that the configuration of the second transmission value is successful. In the above possible examples, the second transmission value is configured by the memory controller, which increases the selectivity of the second transmission value.

In some examples, the method further comprises, after the IO queue is successfully created: receiving a second configuration command, wherein the second configuration command is used to instruct to configure a third transmission value for the memory controller; and if the third transmission value exceeds the preset value range, ignoring the second configuration command. In the above possible examples, the normal execution of subsequent IO traffic is guaranteed, and the performance of the memory controller is improved.

In some examples, the second configuration command is received by the memory controller during execution of IO commands based on the IO queue, and the method further comprises: executing remaining IO commands of the IO commands based on the IO queue. In the above possible examples, the normal execution of subsequent IO traffic is guaranteed, and the performance of the memory controller is improved.

In another aspect, a method of operating an electronic device is provided, the electronic device comprises: a host; and a memory system coupled to the host, wherein the memory system comprises a memory controller, and the method comprises: sending, by the host, a command to create an IO queue to the memory controller; receiving, by the memory controller, the command to create the IO queue; when a first transmission value of the IO queue exceeds a preset value range, sending, by the memory controller, target indication information to the host, wherein the target indication information is to indicate that the first transmission value is invalid, and the first transmission value indicates a size of information received by the IO queue; and receiving, by the host, the target indication information.

In the method of operating the system as provided in the examples of the present disclosure, when the first transmission value of the IO queue exceeds the preset value range, the memory controller sends an indication message indicating that the size of the information received by the IO queue is invalid to the host, and the host receives the indication information to determine whether to reconfigure the transmission value of the information, and whether to proceed subsequent IO traffic, which improves the processing capability of the memory controller for error information, that is, improves the performance of the memory controller, and improves the error judgment mechanism of the host.

In some examples, the IO queue comprises an input/output completion queue, the first transmission value comprises a first value, the preset value range comprises a first preset value range, the first value indicates a size of an execution result received by the input/output completion queue, and the first value exceeds the first preset value range.

In some examples, the IO queue comprises an input/output submission queue, the first transmission value comprises a second value, the preset value range comprises a second preset value range, the second value indicates a size of a command received by the input/output submission queue, and the second value exceeds the second preset value range.

In some examples, the method further comprises: creating, by the memory controller, the IO queue according to a second transmission value, wherein the second transmission value is within the preset value range; sending, by the memory controller, indication information indicating that the IO queue is successfully created to the host; and receiving, by the host, the indication information indicating that the IO queue is successfully created.

In some examples, the second transmission value comprises a recommended value in a non-volatile memory host controller interface specification (NVMe).

In some examples, the method further comprises, before the host receives the indication information indicating that the IO queue is successfully created: sending, by the host, a first configuration command to the memory controller, wherein the first configuration command is used to instruct to configure the second transmission value for the memory controller; receiving, by the memory controller, the first configuration command, and in response to the first configuration command, sending indication information indicating that the configuration of the second transmission value is successful to the host; and receiving, by the host, the indication information indicating that the configuration of the second transmission value is successful.

In some examples, the method further comprises, after the IO queue is successfully created: sending, by the host, a second configuration command to the memory controller, wherein the second configuration command is used to instruct to configure a third transmission value for the memory controller; and receiving, by the memory controller, the second configuration command, and if the third transmission value exceeds the preset value range, ignoring the second configuration command.

In some examples, the method further comprises: sending, by the host, the second configuration command to the memory controller during execution of IO commands based on the IO queue by the memory controller; and receiving, by the memory controller, the second configuration command, and executing remaining IO commands of the IO commands based on the IO queue.

In yet another aspect, a memory controller is provided, and the memory controller is configured to: receive a command to create an IO queue; and when a first transmission value of the IO queue exceeds a preset value range, send target indication information, wherein the target indication information is to indicate that the first transmission value is invalid, and the first transmission value indicates a size of information received by the IO queue.

In some examples, the IO queue comprises an input/output completion queue, the first transmission value comprises a first value, the preset value range comprises a first preset value range, the first value indicates a size of an execution result received by the input/output completion queue, and the first value exceeds the first preset value range.

In some examples, the IO queue comprises an input/output submission queue, the first transmission value comprises a second value, the preset value range comprises a second preset value range, the second value indicates a size of a command received by the input/output submission queue, and the second value exceeds the second preset value range.

In some examples, the memory controller is further configured to: creating the IO queue according to a second transmission value, wherein the second transmission value is within the preset value range; and sending indication information indicating that the IO queue is successfully created.

In some examples, the second transmission value comprises a recommended value in a non-volatile memory host controller interface specification (NVMe).

In some examples, the memory controller is further configured to: receive a first configuration command, wherein the first configuration command is used to instruct to configure the second transmission value for the memory controller; and in response to the first configuration command, sending indication information indicating that the configuration of the second transmission value is successful.

In some examples, the memory controller is further configured to: after the IO queue is successfully created: receive a second configuration command, wherein the second configuration command is used to instruct to configure a third transmission value for the memory controller; and if the third transmission value exceeds the preset value range, ignore the second configuration command.

In some examples, the second configuration command is received by the memory controller during execution of IO commands based on the IO queue, and the memory controller is further configured to: execute remaining IO commands of the IO commands based on the IO queue.

In yet another aspect, an electronic device is provided, the electronic device comprises a host; and a memory system coupled to the host, wherein the memory system comprises a memory controller. The host is configured to: send a command to create an IO queue to the memory controller. The memory controller is configured to: receive the command to create the IO queue. The memory controller is further configured to: when a first transmission value of the IO queue exceeds a preset value range, send target indication information to the host, wherein the target indication information is to indicate that the first transmission value is invalid, and the first transmission value indicates a size of information received by the IO queue. The host is further configured to receive the target indication information.

In some examples, the IO queue comprises an input/output completion queue, the first transmission value comprises a first value, the preset value range comprises a first preset value range, the first value indicates a size of an execution result received by the input/output completion queue, and the first value exceeds the first preset value range.

In some examples, the IO queue comprises an input/output submission queue, the first transmission value comprises a second value, the preset value range comprises a second preset value range, the second value indicates a size of a command received by the input/output submission queue, and the second value exceeds the second preset value range.

In some examples, the memory controller is further configured to: create the IO queue according to a second transmission value, wherein the second transmission value is within the preset value range. The memory controller is further configured to: send indication information indicating that the IO queue is successfully created to the host. The host is further configured to: receive the indication information indicating that the IO queue is successfully created.

In some examples, the second transmission value comprises a recommended value in a non-volatile memory host controller interface specification (NVMe).

In some examples, the host is further configured to: before receiving the indication information indicating that the IO queue is successfully created, send a first configuration command to the memory controller, wherein the first configuration command is used to instruct to configure the second transmission value for the memory controller. The memory controller is further configured to: receive the first configuration command, and in response to the first configuration command, send indication information indicating that the configuration of the second transmission value is successful to the host. The host is further configured to receive the indication information indicating that the configuration of the second transmission value is successful.

In some examples, the host is further configured to: after the IO queue is successfully created, send a second configuration command to the memory controller, wherein the second configuration command is used to instruct to configure a third transmission value for the memory controller. The memory controller is further configured to: receive the second configuration command, and if the third transmission value exceeds the preset value range, ignore the second configuration command.

In some examples, the host is further configured to: send the second configuration command to the memory controller during execution of IO commands based on the IO queue by the memory controller. The memory controller is further configured to: receive the second configuration command, and execute remaining IO commands of the IO commands based on the IO queue.

In yet another aspect, a memory system is provided, the memory system comprises a memory and a memory controller as provided in the foregoing several aspects, and the memory controller is coupled to the memory to perform the method of operating the memory controller as provided in the foregoing several aspects.

In yet another aspect, a computer-readable storage medium is provided. The computer-readable storage medium comprises computer instructions that when run on the memory controller as provided in the foregoing several aspects, cause the memory controller as provided in the foregoing several aspects to perform the method of operating the memory controller as provided in the foregoing several aspects.

In yet another aspect, a computer program product comprising instructions is provided. When the computer program product runs on the memory controller as provided in the foregoing several aspects, cause the memory controller as provided in the foregoing several aspects to perform the method of operating the memory controller as provided in the foregoing several aspects.

BRIEF DESCRIPTION OF THE DRAWINGS

To explain the examples in the present disclosure more clearly, the accompanying drawings that need to be used in describing some examples of the present disclosure will be briefly introduced below. The accompanying drawings in the following description are merely figures of some examples of the present disclosure. For those of ordinary skill in the art, other drawings can also be obtained based on these drawings. In addition, the drawings in the following description can be regarded as schematic diagrams, and are not limitations on the actual size of the product, the actual process of the method, the actual timing of signals, and the like involved in the examples of the present disclosure.

FIGS. 7A and 7B (collectively referred to as FIG. 7) are schematic flowcharts of another method of operating a memory controller according to some examples.

DETAILED DESCRIPTION

Figure 1:
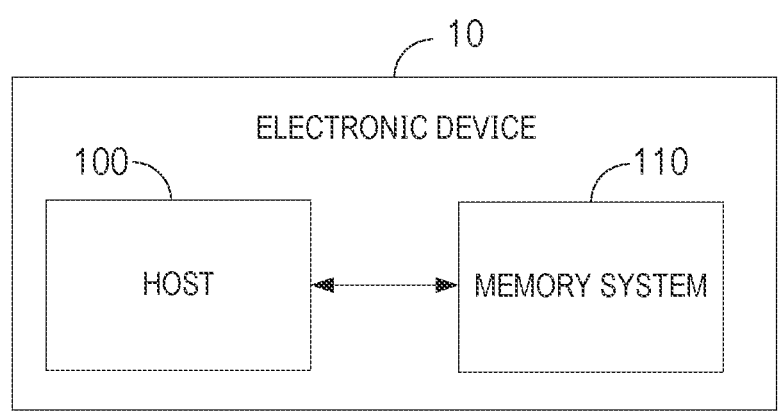
FIG. 1 is a schematic structural diagram of an electronic device according to some examples.

Examples of the present disclosure will be described below in conjunction with the accompanying drawings. The described examples are merely some of the examples of the present disclosure, not all of them. All other examples obtained by persons of ordinary skill in the art based on the examples provided in the present disclosure fall within the protection scope of the present disclosure.

Throughout the specification and claims, the term "comprising" is interpreted in an open and inclusive sense, i.e., "including, but not limited to" unless required otherwise in the context. In the description of the specification, the terms "one example", "some examples", "example", "in some examples" are intended to indicate particular features, structures, materials or characteristics associated with the examples are included in at least one example of the present disclosure. Schematic representations of the above terms are not referring to the same example. Furthermore, the particular features, structures, materials or characteristics described may be included in any suitable manner in any one or more examples.

Hereinafter, the terms "first" and "second" are used for descriptive purposes only, and shall not be understood as indicating or implying relative importance or implicitly specifying the quantity of indicated technical features. Thus, a feature defined by "first" and "second" may explicitly or implicitly include one or more of these features. In the description of the examples of the present disclosure, "plurality" means two or more, unless otherwise specified.

The use of "adapted to" or "configured to" herein means open and inclusive language that does not exclude devices that are adapted to or configured to perform additional tasks or operations.

Additionally, the use of "based on" is open and inclusive, as a process, operation, calculation, or other action that is "based on" one or more stated conditions or values may in practice be based on additional conditions or values that are beyond.

Before introducing the examples of the present disclosure, the non-volatile memory host controller interface specification (NVMHCIS) (NVMe for short) will be introduced first.

As a command layer and application layer protocol, NVMe is theoretically compatible with any interface protocol, and matches peripheral component interconnect express (PCIe) interface in application.

NVMe is a logical device interface specification that defines commands and data formats for communication between a solid state disk (SSD) and a host. For example, NVMe can also define an input/output completion queue entry size (IOCQES) and an input/output submission queue entry size (IOSQES) of a controller in the SSD. IOCQES indicates a size of an execution result of the SSD that can be received by the input/output completion queue (IOCQ), which may include a maximum value and a minimum value. IOSQES indicates a size of commands that are sent by the host and can be received by the input/output submission queue (IOSQ), which may include a maximum value and a minimum value. The maximum value in the above queues (including IOCQ and IOSQ) is the maximum value that the controller can support, and the minimum value is the minimum value that the controller can support.

IO traffic, for example, exchanging data or commands, can be performed between SSD and host through queues (including IOCQ and IOSQ). According to the NVMe protocol, SSD maintains a queue head pointer and a queue tail pointer of multiple queues, and both SSD and host will update the queue head pointer and the queue tail pointer. For example, the host inserts a sent command into the tail of the IOSQ and updates the queue tail pointer of the IOSQ. The SSD compares the queue head pointer and the queue tail pointer of the IOSQ, and, when the two are different, determines that there is a command to be handled in the IOSQ. The SSD fetches the command from the head of the IOSQ and updates the queue head pointer of the IOSQ. The host can determine whether there is room for a new command in the IOSQ based on the queue head pointer and queue tail pointer of the IOSQ. The SSD executes the command and inserts an execution result into the tail of the IOCQ, and updates the queue tail pointer of the IOCQ. When the host receives an interrupt notification from the SSD indicating that there is a new execution result in the IOCQ, the host fetches the execution result from the head of the IOCQ and updates the queue head pointer of the IOCQ. The SSD can determine whether there is room for the new execution result in the IOCQ based on the queue head pointer and the queue tail pointer of the IOCQ.

Currently, when creating an IO queue, if at least one of IOCQES or IOSQES field of the controller of SSD configured by the host exceeds the maximum value that can be supported by the controller, or is a value lower than the minimum value that can be supported by the controller, whether the subsequent IO traffic is affected is not specified in the NVMe protocol, and after the IO traffic fails, the SSD cannot clearly inform the host that the IOCQES and IOSQES fields of the controller are incorrectly configured.

To this end, the examples of the present disclosure provide a method of operating a memory system, a memory system and an electronic device that can improve the processing capability of the memory controller for error information, for example, improve the performance of the memory controller. The system may be an electronic device, and the structure of the electronic device will be firstly described below.

An example of the present disclosure provides an electronic device, such as any of a mobile phone, a desktop computer, a tablet computer, a notebook computer, a server, a vehicle-mounted device, a wearable device (such as a smart watch, a smart bracelet, smart glasses, etc.), a mobile power supply, a game console, a digital multimedia player, etc. Referring to FIG. 1, which shows a schematic diagram of an electronic device 10 according to an example of the present disclosure, the electronic device 10 includes a host 100 and a memory system 110, and the host 100 is coupled to the memory system 110 to write data to the memory system 110 or read data stored in the memory system 110. The host 100 is also referred to as a master device, and the memory system 110 is also referred to as a slave device. In an electronic device, a slave device can be accessed by different master devices. For example, taking the electronic device 10 being a mobile phone as an example, the central processing unit (CPU), a digital signal processor (DSP) and the like of the mobile phone can serve as the host 100 to access the memory system 110.

Figure 2:
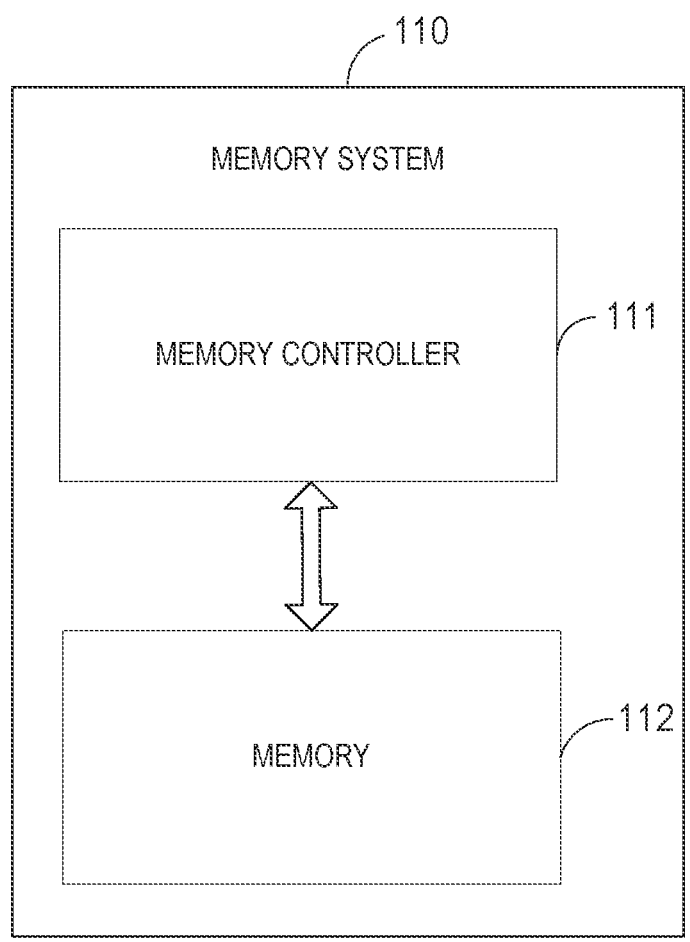
FIG. 2 is a schematic structural diagram of a memory system according to some examples.

As an example, referring to FIG. 2, which shows a schematic diagram of a memory system 110 according to an example of the present disclosure, the memory system 110 includes a memory controller 111 and a memory 112. The memory controller 111 is coupled to the memory 112 to control the memory 112 to store data.

The memory 112 may be a 2-dimension (2D) memory or a 3-dimension (3D) memory. The memory 112 may be a NAND flash memory as provided above. For example, the memory 112 may be single-level cell (SLC) flash memory, multi-level cell (MLC) flash memory, triple-level cell (TLC) flash memory and quad-level cell (QLC) flash memory and the like of the NAND flash memory.

The memory system 110 may be integrated into various types of storage devices, for example, be included in the same package, such as a universal Flash storage (UFS) package or an embedded multimedia card (eMMC) package. For example, the memory system 110 can be applied to and packaged into different types of end electronic products, for example, mobile phones (for example, cell phones), desktop computers, tablet computers, notebook computers, servers, vehicle-mounted devices, game consoles, printers, positioning devices, wearable devices, smart sensors, mobile power supply, virtual reality (VR) devices, augmented reality (AR) devices, or any other suitable electronic device having storage therein.

In some examples, the memory system 110 includes a memory controller 111 and a memory 112, as shown in FIG. 2. The memory system 110 may be integrated into a memory card. The memory card includes any of a personal computer memory card international association (PCMCIA) card (abbreviated as a PC card), a compact flash (CF) card, a smart media (SM) card, a memory stick, a multimedia card (MMC), a secure digital (SD) memory card, or UFS.

Figure 3:
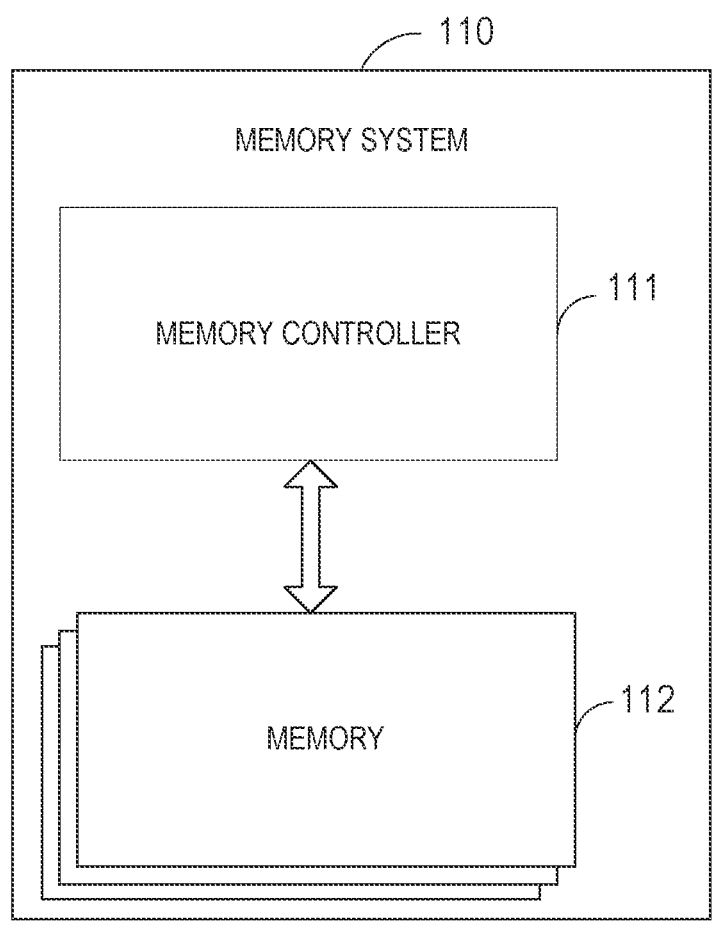
FIG. 3 is a schematic structural diagram of another memory system according to some examples.

In some other examples, referring to FIG. 3, the memory system 110 includes a memory controller 111 and multiple memories 112 as shown in FIG. 3. The memory system 110 is integrated into solid state drives (SSD).

In some examples, in the memory system 110, the memory controller 111 is configured to operate in a low duty-cycle environment like SD cards, CF cards, universal serial bus (abbreviated as USB) Flash drives, or other media for use in electronic devices, such as personal computers, digital cameras, mobile phones, etc.

In some other examples, the memory controller 111 is configured to operate in a high duty-cycle environment SSD or eMMC used as data storage for mobile devices, such as smartphones, tablet computers, notebook computers, etc., and enterprise storage arrays.

In some examples, the memory controller 111 may be configured to manage data stored in the memory 112 and communicate with external devices (e.g., the host 100). In some examples, the memory controller 111 may also be configured to control operations of the memory 112, such as read, erase, and program operations. In some examples, the memory controller 111 may also be configured to manage various functions with respect to data stored or to be stored in the memory 112, including at least one of bad block management, garbage collection (GC), logical to physical address translation or wear leveling. In some examples, the memory controller 111 is further configured to process error correction codes with respect to data read from or written to the memory 112.

The memory controller 111 may also be configured to perform any other suitable functions. For example, in the examples of the present disclosure, the memory controller 111 may also be configured to receive a command to create an input/output (IO) queue, and send indication information indicating that a size of information received by the IO queue is invalid, etc.

In addition, the memory controller 111 may communicate with an external device (e.g., the host 100) via at least one of various interface protocols. For example, the memory controller 111 may communicate with the host 100 via NVMe.

The interface protocol also may include at least one of universal serial bus (USB) protocol, Microsoft management console (MMC) protocol, peripheral component interconnect (PCI) protocol, PCI express (peripheral component interconnect express, PCI-E) protocol, advanced technology attachment (ATA) protocol, serial ATA protocol, parallel ATA protocol, small computer system interface (SCSI) protocol, enhanced small disk interface (ESDI) protocol, integrated drive electronic (IDE) protocol, and firewire protocol.

Figure 4:
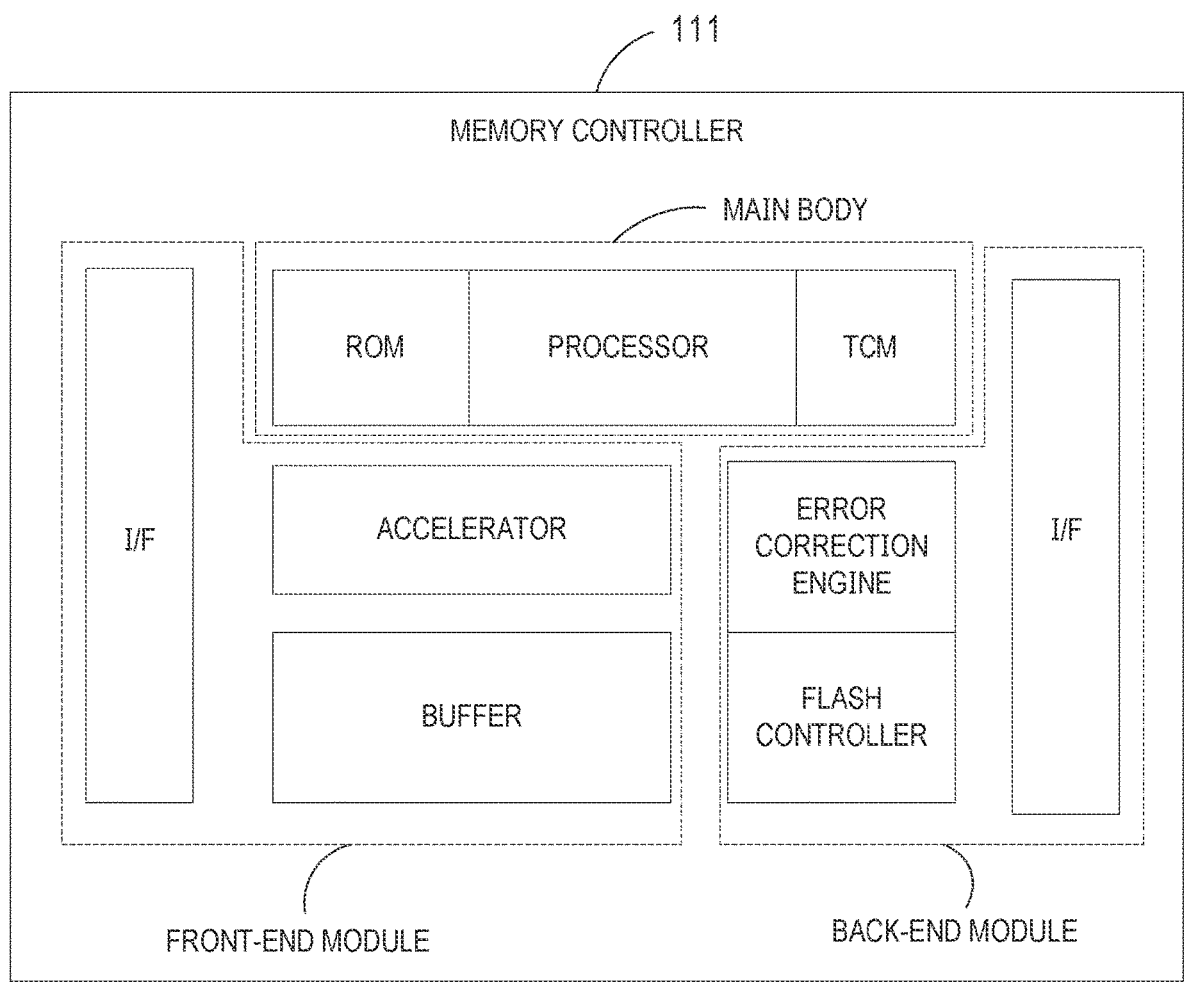
FIG. 4 is a schematic structural diagram of a memory controller according to some examples.

In some examples, referring to FIG. 4, which shows a schematic structural diagram of a memory controller 111 according to an example of the present disclosure, the memory controller 111 includes a front-end module, a main body and a back-end module, and various hardware modules are connected via a bus interconnection.

Figure 5:
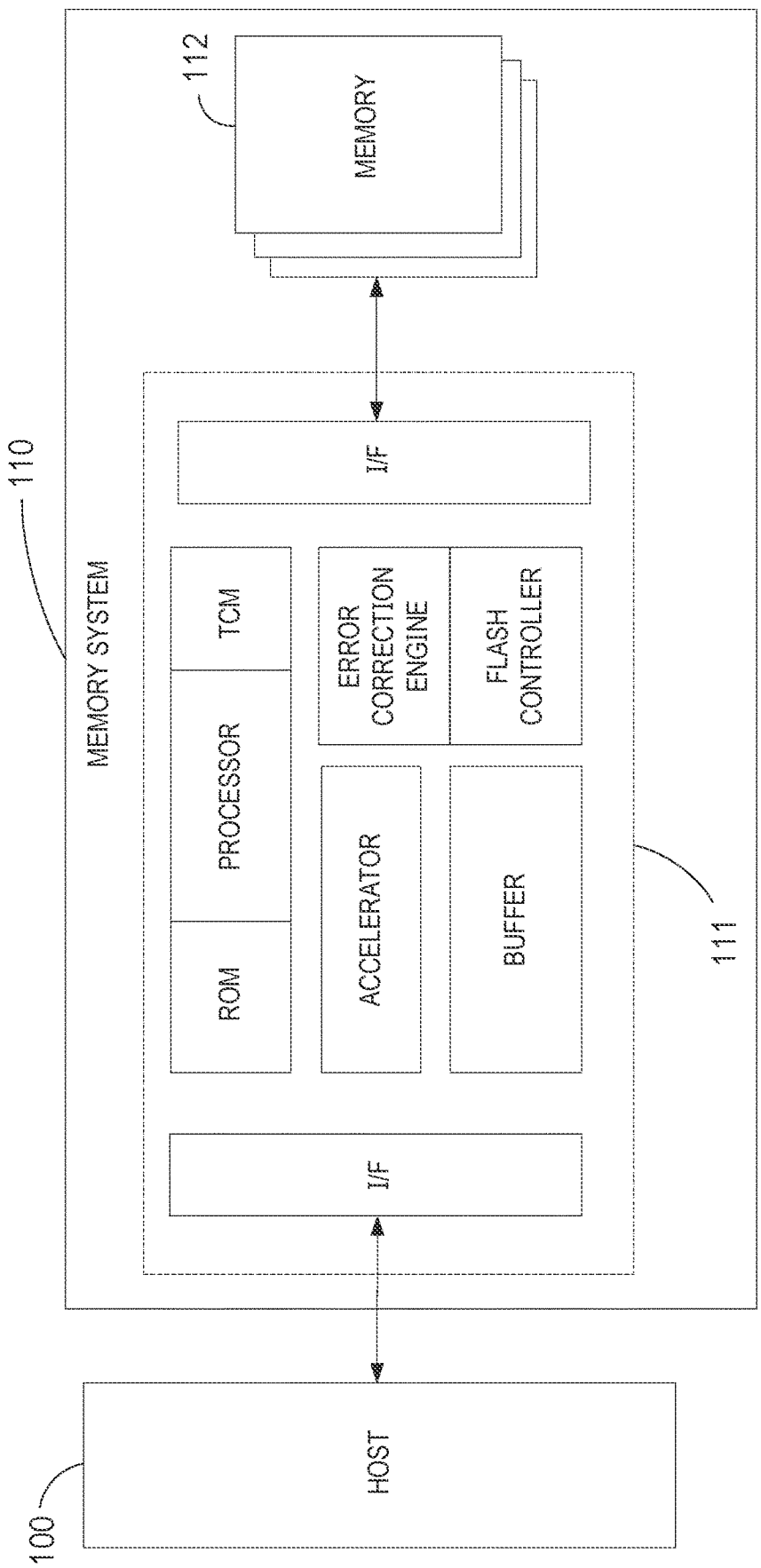
FIG. 5 is a schematic structural diagram of another electronic device according to some examples.

The front-end module communicates with the host. In some examples, as shown in FIG. 5, a front-end interface (I/F) of the front-end module communicates with the host via an interface protocol (e.g., NVMe) to receive commands or data sent by the host. The front-end module may also include buffers and accelerators. The buffers can be configured to store the commands or data sent by the host. The accelerators can be configured to enable acceleration of hardware and improve the performance of the memory controller.

The back-end module communicates with the memory. In some examples, as shown in FIG. 5, a back-end interface (I/F) of the back-end module communicates with a NAND in the memory via an interface protocol to read data in the NAND or store data into the NAND. The back-end module can also include an error correction engine and a flash memory controller. The error correction engine can be configured to enable functions for error correction. The flash memory controller is configured to implement the function of reading and writing data in the NAND according to the interface protocol of the back-end module.

As shown in FIG. 4, the main body includes: a processor, and a memory that cooperates with the processor to perform related operations. The processor may include a central processing unit (CPU). The CPU is responsible for computing and system scheduling. For example, the CPU implements relevant functions (such as writing and reading data from the host to the NAND and other background operations) of each of the hardware modules in the memory controller 111 by running firmware.

As shown in FIG. 4, the memory may include a read-only memory (ROM) and a tightly coupled memory (TCM). The TCM can be configured to store related programs in the firmware.

The firmware is embedded software in nature, for example, a program running in the memory controller 111. For example, the firmware includes the method of operating the memory controller and the method of operating the system, as provided in the examples of the present disclosure.

Flash translation layer (FTL) is the core component of the firmware, and main task of which is to complete the mapping from logical address space of the host (a host or a user) to physical address space of the memory (NAND). For instance, the FTL layer may assign a flash memory space for each of the received data, and write the data into a corresponding flash memory space via an interface of the back-end module based on the address of the assigned flash memory space. In addition, garbage collection, wear leveling, bad block management, read interference management, data retention management, error handling and other tasks will be handled.

Figure 6:
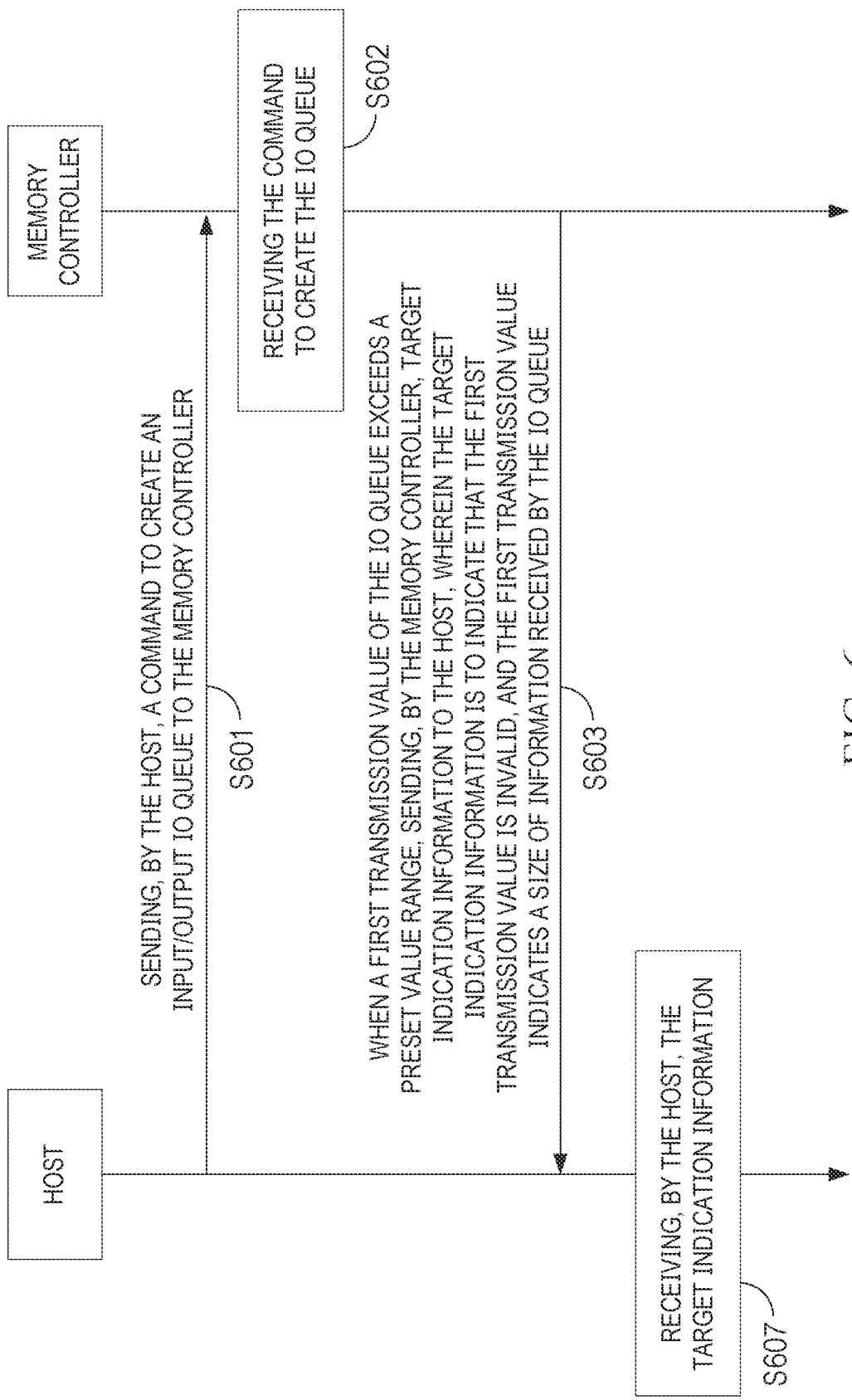
FIG. 6 is a schematic flowchart of a method of operating a memory controller according to some examples.

Based on the memory controller shown in FIG. 4, a method of operating the memory controller as provided in the examples of the present disclosure will be described below. Referring to FIG. 6, which shows a schematic flow chart of the method of operating the memory controller as provided in the examples of the present disclosure. The method of operating the memory controller as provided in the examples of the present disclosure may include the following operations.

Operation S601. Sending, by the host, a command to create an input/output (IO) queue to the memory controller.

The IO queue may include IOCQ and IOSQ.

The order of creating the IO queue is opposite to that of deleting the IO queue. For example, when creating the queue, IOCQs are created first, and then IOSQs are created. When deleting the IO queue, IOSQs are deleted first, and then IOCQs are deleted.

Because the IO queue may include two different situations, the command sent is different when the queue is different. The two different situations will be introduced and explained below.

In the first possible example, the IO queue is an IOCQ. In some examples, as shown in operation S601a in FIG. 7, the host sends a command to create an IOCQ to the memory controller at operation S601a.

In the second possible example, the IO queue is an IOSQ. In some examples, as shown in operation S601b in FIG. 8, the host sends a command to create an IOSQ to the memory controller at operation S601b.

Returning to FIG. 6, Operation S602. Receiving, by the memory controller, the command to create the IO queue.

Because the IO queue may include two different situations, the command received is different when the queue is different. The two different situations will be introduced and explained below.

In the first possible example, the IO queue is an IOCQ, and the memory controller receives a command to create an IOCQ queue sent by the host. In some examples, as shown in operation S602a in FIG. 7, the memory controller receives a command to create an IOCQ at operation S602a.

In the second possible example, the IO queue is an IOSQ, and the memory controller receives a command to create an IOSQ queue sent by the host. In some examples, as shown in operation S602b in FIG. 8, the memory controller receives a command to create an IOSQ at operation S602b.

In the second possible example, before operation S602b, the host sends a command to create an IOCQ to the memory controller, and the memory controller receives the command to create the IOCQ, and sends an indication message indicating that the IOCQ is successfully created to the host in response to the command. In some examples, as shown in operation S801 in FIG. 8, the host sends the command to create the IOCQ to the memory controller. At operation S802, the memory controller receives the command to create the IOCQ. At operation S803, the memory controller sends the indication information indicating that the IOCQ is successfully created to the host.

Returning to FIG. 6, the method of operating the memory controller according to the example of the present disclosure further includes:

Operation S603. When a first transmission value of the IO queue exceeds a preset value range, sending, by the memory controller, target indication information to the host, wherein the target indication information is to indicate that the first transmission value is invalid, and the first transmission value indicates a size of information received by the IO queue.

The first transmission value includes a first value and a second value. The first value indicates a size of an execution result sent by the SSD and received by the IOCQ. The execution result is the execution result of the memory controller based on the IO command sent by the host. The second value indicates a size of a command sent by the host and received by the IOSQ, wherein the command includes the IO command.

Figure 7B:
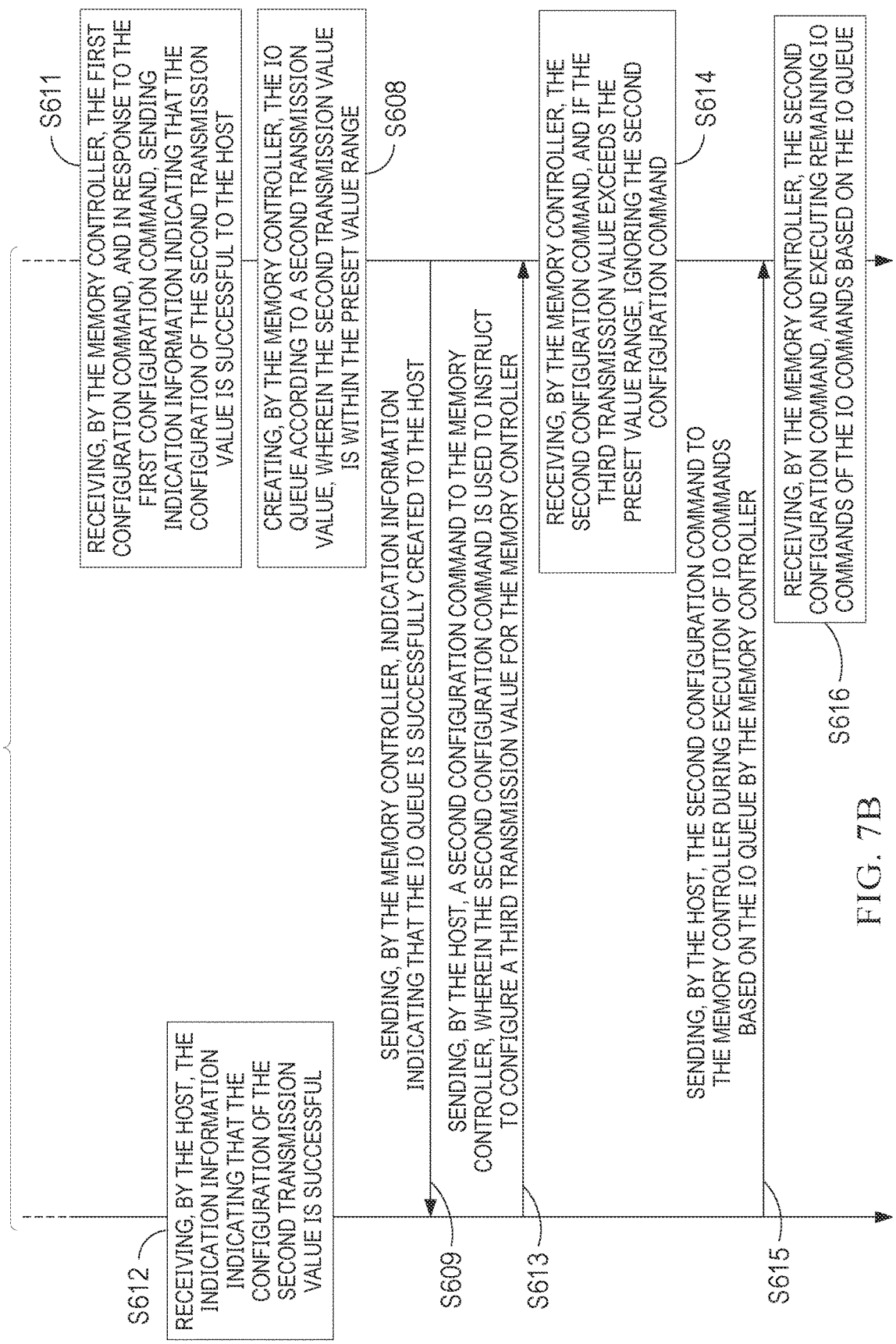
Figure 8A:
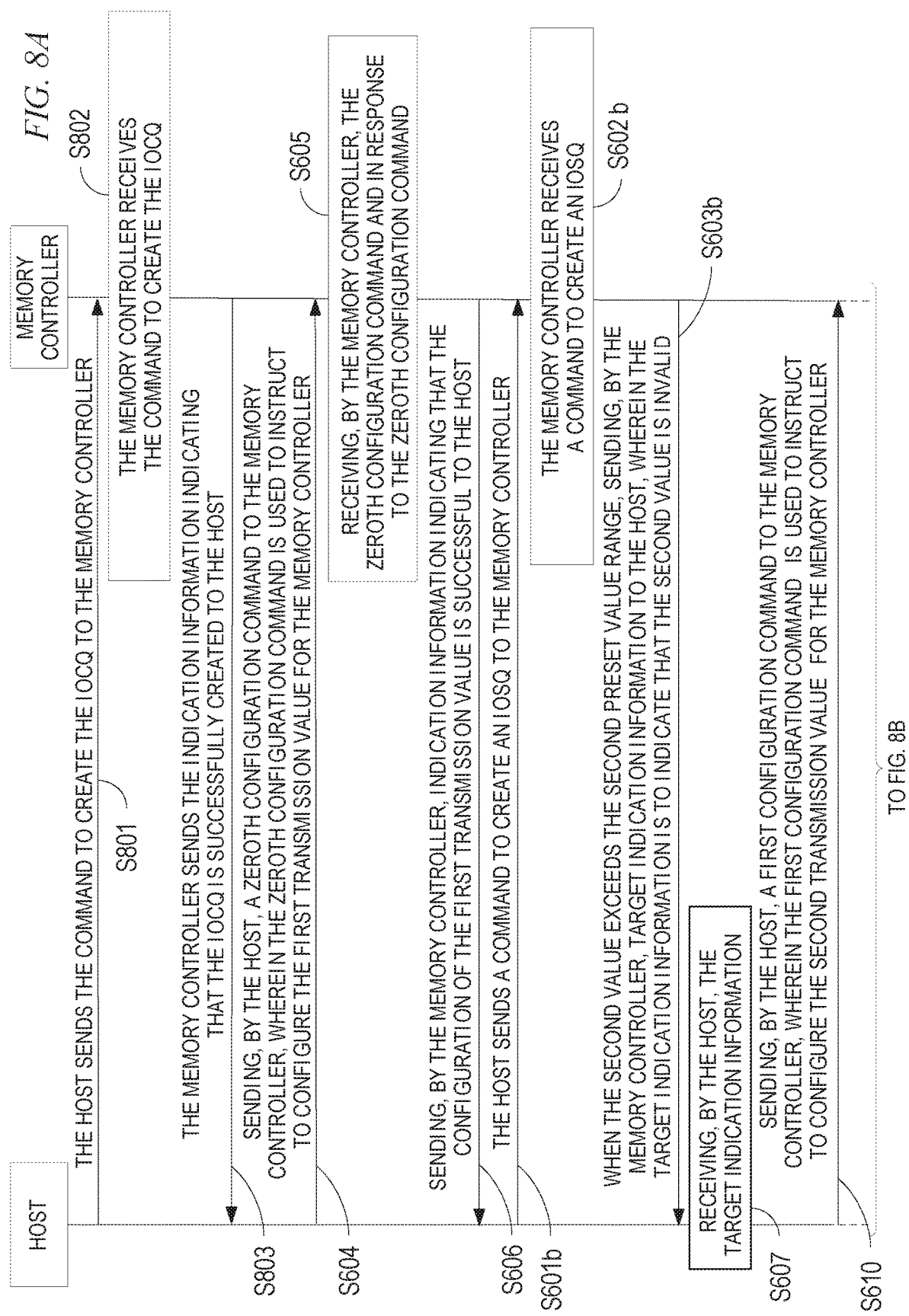
FIGS. 8A and 8B (collectively referred to as FIG. 8) are schematic flowcharts of yet another method of operating a memory controller according to some examples.
Figure 8B:
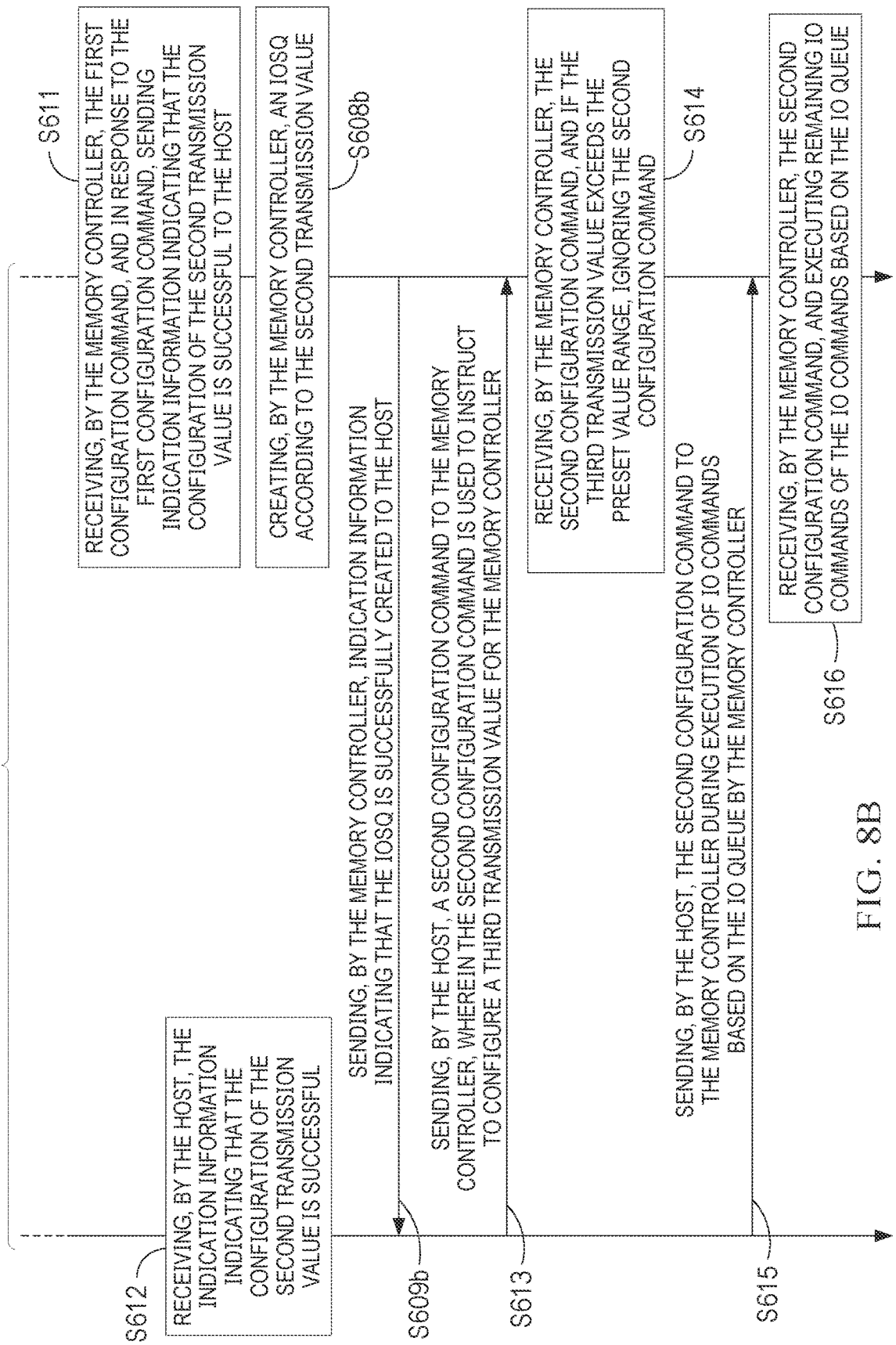

In addition, the first transmission value is configured by the host. For example, before operation S601, the host sends a zeroth configuration command to the memory controller, wherein the zeroth configuration command is used to instruct to configure the first transmission value for the memory controller. The memory controller receives the zeroth configuration command, and in response to the zeroth configuration command, send indication information indicating that the configuration of the first transmission value is successful to the host. In some examples, as shown in FIG. 7 and FIG. 8, the method of operating the memory controller as provided in the examples of the present disclosure further includes:

Operation S604. Sending, by the host, a zeroth configuration command to the memory controller, wherein the zeroth configuration command is used to instruct to configure the first transmission value for the memory controller.

Operation S605. Receiving, by the memory controller, the zeroth configuration command and in response to the zeroth configuration command.

Operation S606. Sending, by the memory controller, indication information indicating that the configuration of the first transmission value is successful to the host.

In addition, the preset value range includes a first preset value range and a second preset value range. The first preset value range is the range between the maximum and minimum values of IOCQES defined in NVMe, and the second preset value range is the range between the maximum and minimum values of IOSQES defined in NVMe.

The IO queue may include two different situations, and the target indication information is different when the queue is different. The target indication information under the two different situations will be introduced and explained below.

In the first possible example, the IO queue is an IOCQ, the first transmission value includes a first value, the preset value range includes a first preset value range, wherein the first value indicates a size of an execution result received by the IOCQ, and the target indication information being used to indicate that the first value exceeds the first preset value range. For example, the first preset range is 16 bytes to 64 bytes, and the first value is 128 bytes. In some examples, as shown in operation S603a in FIG. 7, when the first value exceeds the first preset value range, sending, by the memory controller, target indication information to the host at operation S603a, wherein the target indication information is to indicate that the first value is invalid.

In the second possible example, the IO queue is an IOSQ, the first transmission value includes a second value, the preset value range includes a second preset value range, wherein the second value indicates a size of a command received by the IOSQ, and the target indication information being used to indicate that the second value exceeds the second preset value range. For example, the second preset range is 64 bytes to 128 bytes, and the second value is 16 bytes. In some examples, as shown in operation S603b in FIG. 8, when the second value exceeds the second preset value range, sending, by the memory controller, target indication information to the host at operation S603b, wherein the target indication information is to indicate that the second value is invalid.

As shown in FIG. 6, the method of operating the memory controller as provided in the example of the present disclosure may further include:

Operation S607. Receiving, by the host, the target indication information.

In a possible example, as shown in FIG. 7, the method of operating the memory controller as provided in the examples of the present disclosure may further include:

Operation S608. Creating, by the memory controller, the IO queue according to a second transmission value, wherein the second transmission value is within the preset value range.

Operation S609. Sending, by the memory controller, indication information indicating that the IO queue is successfully created to the host.

In some possible examples, the second transmission value may include a recommended value in NVMe, and the recommended value is within the preset value range. The recommended value may be preset and stored in a corresponding memory, for example, NAND. In some examples, the recommended value may be stored in a submission queue entry size (SQES) field and a completion queue entry size (CQES) field of an identify controller data structure.

In some other possible examples, the second transmission value may be reconfigured for the memory controller by the host. For example, before the operation S608, the host sends a first configuration command to the memory controller, and the first configuration command is used to instruct to configure the second transmission value for the memory controller. The memory controller configures the second transmission value according to the first configuration command, and sends indication information indicating that the configuration of the second transmission value is successful to the host. In some examples, as shown in FIG. 7, before the operation S608, the method of operating the memory controller as provided in the examples of the present disclosure further includes:

Operation S610. Sending, by the host, a first configuration command to the memory controller, wherein the first configuration command is used to instruct to configure the second transmission value for the memory controller.

In some examples, the first configuration command is used to instruct the memory controller to configure the second transmission value for the IOCQES and the IOSQES.

Operation S611. Receiving, by the memory controller, the first configuration command, and in response to the first configuration command, sending indication information indicating that the configuration of the second transmission value is successful to the host.

Operation S612. Receiving, by the host, the indication information indicating that the configuration of the second transmission value is successful.

Since that the IO queue may include two different situations, the process of creating the queue by using the second transmission value when the IO queue includes different queues will be described below.

In the first possible example, as shown in FIG. 7, the IO queue is an IOCQ, and creating the IO queue according to the second transmission value includes: creating an IOCQ according to the second transmission value, creating an IOSQ according to the second transmission value, and sending indication information indicating that the IO queue is successfully created, wherein the indication information is to indicate the IOCQ and IOSQ are successfully created.

In the second possible example, the IO queue is an IOSQ, and creating the IO queue according to the second transmission value only includes: creating an IOSQ according to the second transmission value, and sending indication information indicating that the IOSQ is successfully created. In some examples, as shown in FIG. 8, the method of operating the memory controller as provided in the examples of the present disclosure further includes:

Operation S608b. Creating, by the memory controller, an IOSQ according to the second transmission value.

Operation S609b. Sending, by the memory controller, indication information indicating that the IOSQ is successfully created to the host.

In a possible example, after the IO queue is successfully created and before the host sends IO commands to the memory controller, that is, IO traffic between the host and the memory controller has not started, if the host sends a second configuration command to the memory controller, the memory controller ignores the second configuration command and executes subsequent IO traffic with the IO queue created in the operation S608, wherein the second configuration command is used to instruct to configure a third transmission value that is beyond the preset range for the memory controller. In some examples, as shown in FIG. 7, the method of operating the memory controller as provided in the example of the present disclosure further includes:

Operation S613. Sending, by the host, a second configuration command to the memory controller, wherein the second configuration command is used to instruct to configure a third transmission value for the memory controller.

Operation S614. Receiving, by the memory controller, the second configuration command, and if the third transmission value exceeds the preset value range, ignoring the second configuration command.

In a possible example, after the IO queue is successfully created, and the host sends IO commands to the memory controller, that is, the memory controller executes the IO commands based on the IO queue created in the operation S608. During this process, if the host sends the second configuration command to the memory controller, the memory controller ignores the second configuration command, and continues to execute remaining IO commands of the IO commands with the IO queue created in the operation S608. In some examples, as shown in FIG. 7, after the operation S614, the method of operating the memory controller as provided in the examples of the present disclosure further includes:

Operation S615. Sending, by the host, the second configuration command to the memory controller during execution of IO commands based on the IO queue by the memory controller.

Operation S616. Receiving, by the memory controller, the second configuration command, and executing remaining IO commands of the IO commands based on the IO queue.

Examples of the present disclosure also provide a memory controller, for example, the memory controller 111 shown in FIG. 4 in the foregoing examples.

In a possible example of the present application, the memory controller is configured to: receive a command to create an IO queue; and when a first transmission value of the IO queue exceeds a preset value range, send target indication information, wherein the target indication information is to indicate that the first transmission value is invalid, and the first transmission value indicates a size of information received by the IO queue.

In a possible example of the present application, the IO queue comprises an input/output completion queue IOCQ, the first transmission value comprises a first value, the preset value range comprises a first preset value range, the first value indicates a size of an execution result received by the IOCQ, and the first value exceeds the first preset value range.

In a possible example of the present application, the IO queue comprises an input/output submission queue IOSQ, the first transmission value comprises a second value, the preset value range comprises a second preset value range, the second value indicates a size of a command received by the IOSQ, and the second value exceeds the second preset value range.

In a possible example of the present application, the memory controller is further configured to: create the IO queue according to a second transmission value, wherein the second transmission value is within the preset value range; and send indication information indicating that the IO queue is successfully created.

In a possible example of the present application, the second transmission value comprises a recommended value in a non-volatile memory host controller interface specification (NVMe).

In a possible example of the present application, the memory controller is further configured to: receive a first configuration command, wherein the first configuration command is used to instruct to configure the second transmission value for the memory controller, and in response to the first configuration command, send indication information indicating that the configuration of the second transmission value is successful.

In a possible example of the present application, the memory controller is further configured to: after the IO queue is successfully created, receive a second configuration command, wherein the second configuration command is used to instruct to configure a third transmission value for the memory controller, and if the third transmission value exceeds the preset value range, ignore the second configuration command.

In a possible example of the present application, the second configuration command is received by the memory controller during execution of IO commands based on the IO queue, and the memory controller is further configured to: execute remaining IO commands of the IO commands based on the IO queue.

An example of the present disclosure further provides an electronic device. The system includes a host and a memory system coupled to the host, for example, the memory system 110 shown in FIG. 2, FIG. 3 and FIG. 5. The memory system 110 includes a memory 112, and the memory controller 111 provided in the above examples. The memory controller 111 is coupled to the memory 112 to write data into the memory 112 or read data stored in the memory 112.

In a possible example of the present application, the host is configured to send a command to create an IO queue to the memory controller. The memory controller is configured to receive the command to create the IO queue. The memory controller is further configured to: when a first transmission value of the IO queue exceeds a preset value range, send target indication information to the host, wherein the target indication information is to indicate that the first transmission value is invalid, and the first transmission value indicates a size of information received by the IO queue. The host is further configured to receive the target indication information.

In a possible example of the present application, the IO queue comprises an input/output completion queue IOCQ, the first transmission value comprises a first value, the preset value range comprises a first preset value range, the first value indicates a size of an execution result received by the IOCQ, and the first value exceeds the first preset value range.

In a possible example of the present application, the IO queue comprises an input/output submission queue IOSQ, the first transmission value comprises a second value, the preset value range comprises a second preset value range, the second value indicates a size of a command received by the IOSQ, and the second value exceeds the second preset value range.

In a possible example of the present application, the memory controller is further configured to: create the IO queue according to a second transmission value, wherein the second transmission value is within the preset value range. The memory controller is further configured to send indication information indicating that the IO queue is successfully created to the host. The host is further configured to: receive the indication information indicating that the IO queue is successfully created.

In a possible example of the present application, the second transmission value comprises a recommended value in a non-volatile memory host controller interface specification (NVMe).

In a possible example of the present application, the host is further configured to: before receiving the indication information indicating that the IO queue is successfully created, send a first configuration command to the memory controller, wherein the first configuration command is used to instruct to configure the second transmission value for the memory controller. The memory controller is further configured to: receive the first configuration command, and in response to the first configuration command, send indication information indicating that the configuration of the second transmission value is successful to the host. The host is further configured to receive the indication information indicating that the configuration of the second transmission value is successful.

In a possible example of the present application, the host is further configured to: after the IO queue is successfully created, send a second configuration command to the memory controller, wherein the second configuration command is used to instruct to configure a third transmission value for the memory controller. The memory controller is further configured to: receive the second configuration command, and if the third transmission value exceeds the preset value range, ignore the second configuration command.

In a possible example of the present application, the host is further configured to: send the second configuration command to the memory controller during execution of IO commands based on the IO queue by the memory controller. The memory controller is further configured to: receive the second configuration command, and execute remaining IO commands of the IO commands based on the IO queue.

Examples of the present disclosure also provide a memory system, such as the memory system 110 shown in FIG. 2, FIG. 3 and FIG. 4 in the foregoing examples. The memory system 110 includes a memory 112 and the memory controller 111 provided in the foregoing examples. The memory controller 111 is coupled to the memory 112 to write data into the memory or read data stored in the memory.

Examples of the present disclosure further provide an electronic device, such as the electronic device 10 shown in FIG. 1 in the foregoing examples. The electronic device 10 includes a host 100 and the memory system 110 provided in the aforementioned several examples. The host 100 is connected to the memory system 110 to write data into the memory system 110 or read data stored in the memory system.

Examples of the present disclosure further provide a computer-readable storage medium comprising computer instructions that when run on the memory controller provided in the aforementioned several examples, cause the memory controller to perform the method of operating the memory system as provided in the examples of the present disclosure.

Examples of the present disclosure further provide a computer program product comprising instructions. When the computer program product runs on the memory controller provided in the aforementioned several examples, cause the memory controller to perform the method of operating the memory system as provided in the examples of the present disclosure.

The above description is only an example of the present disclosure, but the scope of protection of the present disclosure is not limited thereto. Any changes or substitutions that can be easily conceived by those skilled in the art within the technical scope disclosed in the present disclosure shall be encompassed within the protection scope of the present disclosure. Therefore, the protection scope of the present disclosure should be determined by the protection scope of the claims.

What is claimed is:

1. A method of operating a memory controller, comprising:
receiving a command to create an input/output (IO) queue;
when a first transmission value of the IO queue exceeds a preset value range, sending target indication information, wherein the target indication information is to indicate that the first transmission value is invalid, and the first transmission value indicates a size of information received by the IO queue;
creating the IO queue according to a second transmission value, wherein the second transmission value is within the preset value range and comprises a recommended value in a non-volatile memory host controller interface specification (NVMe);
sending indication information indicating that the IO queue is successfully created;
receiving a second configuration command, wherein the second configuration command is an instruction for the memory controller to configure a third transmission value;
if the third transmission value exceeds the preset value range, ignoring the second configuration command; and
executing remaining IO commands of the IO commands based on the IO queue.

2. The method of claim 1, wherein the IO queue comprises an IO completion queue, the first transmission value comprises a first value, the preset value range comprises a first preset value range, the first value indicates a size of an execution result received by the IO completion queue, and the first value exceeds the first preset value range.

3. The method of claim 1, wherein the IO queue comprises an IO submission queue, the first transmission value comprises a second value, the preset value range comprises a second preset value range, the second value indicates a size of a command received by the IO submission queue, and the second value exceeds the second preset value range.

4. The method of claim 1, further comprising:
creating the IO queue according to a second transmission value, wherein the second transmission value is within the preset value range and comprises a recommended value in a non-volatile memory host controller interface specification (NVMe); and
sending indication information indicating that the IO queue is successfully created.

5. The method of claim 4, further comprising:
receiving a first configuration command, wherein the first configuration command is an instruction for the memory controller to configure the second transmission value; and
in response to the first configuration command, sending indication information indicating that the configuration of the second transmission value is successful.

6. The method of claim 1, wherein the preset value range comprises:
a first preset value range defined according to maximum and minimum values of an input/output completion queue entry size (IOCQES) defined by a non-volatile memory host controller interface specification (NVMe); and
a second preset value range defined according to maximum and minimum values of an input/output submission queue entry size (IOSQES) defined by the NVMe.

7. The method of claim 1, wherein the second configuration command is received by the memory controller during execution of IO commands based on the IO queue.

8. The method of claim 1, wherein the second configuration command is received by the memory controller before execution of IO commands based on the IO queue.

9. A method of operating an electronic device, wherein the electronic device comprises:
a host; and
a memory system coupled to the host, wherein the memory system comprises a memory controller, and the method comprises:
sending, by the host, a command to create an input/output (IO) queue to the memory controller;
receiving, by the memory controller, the command to create the IO queue;
when a first transmission value of the IO queue exceeds a preset value range, sending, by the memory controller, target indication information to the host, wherein the target indication information is to indicate that the first transmission value is invalid, and the first transmission value indicates a size of information received by the IO queue;
receiving, by the host, the target indication information;
creating, by the memory controller, the IO queue according to a second transmission value, wherein the second transmission value is within the preset value range and comprises a recommended value in a non-volatile memory host controller interface specification (NVMe);
sending, by the memory controller, indication information indicating that the IO queue is successfully created to the host; and
receiving, by the host, the indication information indicating that the IO queue is successfully created;
sending, by the host, a second configuration command to the memory controller, wherein the second configuration command is an instruction for the memory controller to configure a third transmission value; and
receiving, by the memory controller, the second configuration command, and if the third transmission value exceeds the preset value range, ignoring the second configuration command.

10. The method of claim 9, wherein the IO queue comprises an IO completion queue, the first transmission value comprises a first value, the preset value range comprises a first preset value range, the first value indicates a size of an execution result received by the IO completion queue, and the first value exceeds the first preset value range.

11. The method of claim 9, wherein the IO queue comprises an IO submission queue, the first transmission value comprises a second value, the preset value range comprises a second preset value range, the second value indicates a size of a command received by the IO submission queue, and the second value exceeds the second preset value range.

12. The method of claim 11, further comprising, before the host receives the indication information indicating that the IO queue is successfully created:
sending, by the host, a first configuration command to the memory controller, wherein the first configuration command is an instruction for the memory controller to configure the second transmission value;

receiving, by the memory controller, the first configuration command, and in response to the first configuration command, sending indication information indicating that the configuration of the second transmission value is successful to the host; and receiving, by the host, the indication information indicating that the configuration of the second transmission value is successful.

13. The method of claim 11, further comprising:

sending, by the host, the second configuration command to the memory controller during execution of IO commands based on the IO queue by the memory controller; and receiving, by the memory controller, the second configuration command, and executing remaining IO commands of the IO commands based on the IO queue.

14. The method of claim 9, wherein the preset value range comprises:

a first preset value range defined according to maximum and minimum values of an input/output completion queue entry size (IOCQES) defined by a non-volatile memory host controller interface specification (NVMe); and a second preset value range defined according to maximum and minimum values of an input/output submission queue entry size (IOSQES) defined by the NVMe.

15. An electronic device, comprising:

a host; and a memory system coupled to the host, wherein the memory system comprises a memory controller, and the host is configured to:
 send, to the memory controller, a command to create an input/output (IO) queue;

the memory controller is configured to:
 receive the command to create the IO queue; and
 when a first transmission value of the IO queue exceeds a preset value range, send target indication information to the host, wherein the target indication information is to indicate that the first transmission value is invalid, and the first transmission value indicates a size of information received by the IO queue; the host is further configured to:
 receive the target indication information; and
 after the IO queue is successfully created, send a second configuration command to the memory controller during execution of IO commands based on the IO queue by the memory controller, wherein the second configuration command is an instruction for the memory controller to configure a third transmission value; and the memory controller is further configured to:
receive the second configuration command;
if the third transmission value exceeds the preset value range, ignore the second configuration command; and
execute remaining IO commands of the IO commands based on the IO queue.

16. The electronic device of claim 15, wherein the IO queue comprises an IO completion queue, the first transmission value comprises a first value, the preset value range comprises a first preset value range, the first value indicates a size of an execution result received by the IO completion queue, and the first value exceeds the first preset value range.

17. The electronic device of claim 15, wherein the IO queue comprises an IO submission queue, the first transmission value comprises a second value, the preset value range comprises a second preset value range, the second value indicates a size of a command received by the IO submission queue, and the second value exceeds the second preset value range.

18. The electronic device of claim 15, wherein, the memory controller is further configured to:
 create the IO queue according to a second transmission value, wherein the second transmission value is within the preset value range and comprises a recommended value in a non-volatile memory host controller interface specification (NVMe); and
 send, to the host, indication information indicating that the IO queue is successfully created; and the host is further configured to:
 receive the indication information indicating that the IO queue is successfully created.

19. The electronic device of claim 18, wherein, the host is further configured to:
 before receiving the indication information indicating that the IO queue is successfully created, send a first configuration command to the memory controller, wherein the first configuration command is an instruction for the memory controller to configure the second transmission value;

the memory controller is further configured to:
 receive the first configuration command, and in response to the first configuration command, send indication information indicating that the configuration of the second transmission value is successful to the host; and the host is further configured to:
 receive the indication information indicating that the configuration of the second transmission value is successful.

20. The electronic device of claim 15, wherein the preset value range comprises:

a first preset value range defined according to maximum and minimum values of an input/output completion queue entry size (IOCQES) defined by a non-volatile memory host controller interface specification (NVMe); and a second preset value range defined according to maximum and minimum values of an input/output submission queue entry size (IOSQES) defined by the NVMe.

* * * * *